United States Patent
Flore et al.

(10) Patent No.: US 8,515,478 B2
(45) Date of Patent: Aug. 20, 2013

(54) FAST STATE TRANSITION FOR A UE WITH RECONFIGURATION OVER PAGING

(75) Inventors: Oronzo Flore, Ostuni (IT); Aleksandar Damnjanovic, Del Mar, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 1342 days.

(21) Appl. No.: 11/955,323

(22) Filed: Dec. 12, 2007

(65) Prior Publication Data

US 2008/0182594 A1 Jul. 31, 2008

Related U.S. Application Data

(60) Provisional application No. 60/870,580, filed on Dec. 18, 2006.

(51) Int. Cl.
*H04B 7/00* (2006.01)
*H04W 68/00* (2009.01)

(52) U.S. Cl.
USPC .......................................... 455/515; 455/458

(58) Field of Classification Search
USPC .................................. 455/458, 515
See application file for complete search history.

(56) References Cited

U.S. PATENT DOCUMENTS

| 6,889,067 | B2 | 5/2005 | Willey |
| 6,999,753 | B2 | 2/2006 | Beckmann et al. |
| 7,013,131 | B2 * | 3/2006 | Lee et al. ................... 455/415 |
| 7,515,922 | B2 * | 4/2009 | Kim et al. .................. 455/515 |
| 8,009,603 | B2 * | 8/2011 | Lu et al. ..................... 370/312 |
| 2004/0127243 | A1 * | 7/2004 | Sarkkinen ................... 455/511 |
| 2004/0224709 | A1 * | 11/2004 | Yi et al. ..................... 455/515 |
| 2005/0009527 | A1 * | 1/2005 | Sharma ...................... 455/445 |
| 2005/0090278 | A1 | 4/2005 | Jeong et al. |
| 2005/0164683 | A1 | 7/2005 | Roberts et al. |
| 2005/0250504 | A1 * | 11/2005 | Mikola ....................... 455/450 |

FOREIGN PATENT DOCUMENTS

| EP | 1675428 | 6/2006 |
| JP | 2007522763 A | 8/2007 |
| WO | WO2005079085 A1 | 8/2005 |
| WO | WO2006020983 | 2/2006 |

OTHER PUBLICATIONS

Dorot V. et al., Glossary of the modern computer lexis (2nd edition), BHV-Petersburg, Saint Petersburg, 2001-D1-p. 339.

(Continued)

*Primary Examiner* — Huy C Ho
(74) *Attorney, Agent, or Firm* — Darren M. Simon

(57) ABSTRACT

Techniques to support fast state transition by a user equipment (UE) are described. The UE may operate in a first state (e.g., a CELL_PCH state) in which the UE does not transmit or receive user data. The UE may receive a paging message carrying first configuration information. The UE may transition from the first state to a second state (e.g., a CELL_DCH state) in response to receiving the paging message. The UE may determine a set of communication parameters based on the first configuration information received from the paging message and second configuration information stored at the UE. The UE may then exchange user data based on the set of communication parameters. The UE may use default values for some parameters in order to reduce the amount of first configuration information to send in the paging message.

34 Claims, 8 Drawing Sheets

(56) References Cited

OTHER PUBLICATIONS

3GPP TS 25.331 v8.0.0; "3rd Generation Partnership Project; Radio Resource Control (RRC); Protocol Specification," 3GPP Technical Specification, Jan. 2008.
3GPP TS 25.423 v7.6.0; "3rd Generation Partnership Project; Technical Specification Group Radio Access Network; UTRAN Iur interface Radio Network Subsystem Application Part (RNSAP) signalling (Release 7)," 3GPP Technical Specification, Sep. 2007.
3GPP TS 25.433 v7.6.0; "3rd Generation Partnership Project; Technical Specification Group Radio Access Network; UTRAN Iub interface Node B Application Part (NBAP) signalling (Release 7)," 3GPP Technical Specification, Sep. 2007.
3GPP TSG RAN WG2 #56; "Enhanced paging procedure," R2-063210, Source: Nokia Ericsson; Riga, Latvia, Nov. 6-10, 2006.
ETSI TS 125 211 v7.2.0; "Universal Mobile Telecommunications System (UMTS); Physical channels and mapping of transport channels onto physical channels (FDD) (3GPP TS 25.211 version 7.2.0 Release 7);" 3GPP Technical Specification, May 2007.
ETSI TS 125 331 v7.2.0; "Universal Mobile Telecommunications System (UMTS); Radio Resource Control (RRC); Protocol specification (3GPP TS 25.331 version 7.2.0 Release 7)," 3GPP Technical Specification, Sep. 2006.
ETSI TS 125.331 v7.6.0 Section 8.2.2.3; "Universal Mobile Telecommunications System (UMTS); Radio Resource Control (RRC); Protocol Specification (3GPP TS 25.331 version 7.6.0 Release 7)," 3GPP Technical Specification, Oct. 2007.
ETSI TS 125.331 v7.6.0 Section 8.3.1.6 "Universal Mobile Telecommunications System (UMTS); Radio Resource Control (RRC); Protocol Specification (3GPP TS 25.331 version 7.0.0 Release 7)," 3GPP Technical Specification, Oct. 2007.
ETSI TS 125.331 v7.6.0 Section 8.5.40; "Universal Mobile Telecommunications System (UMTS); Radio Resource Control (RRC); Protocol Specification (3GPP TS 25.331 version 7.6.0 Release 7);" 3GPP Technical Specification, Oct. 2007.
ETSI TS 125.331 v7.6.0 Section 10.3.6.36c; "Universal Mobile Telecommunications System (UMTS); Radio Resource Control (RRC); Protocol Specification (3GPP TS 25.331 version 7.6.0 Release 7)," 3GPP Technical Specification, Oct. 2007.
ETSI TS 125.331 v7.6.0 Section 10.3.6.36d; "Universal Mobile Telecommunications System (UMTS); Radio Resource Control (RRC); Protocol Specification (3GPP TS 25.331 version 7,.6.0 Release 7)," 3GPP Technical Specification, Oct. 2007.
Partial International Search Report-PCT/US2007/087812, International Searching Authority—European Patent Office—Jun. 25, 2008.
International Search Report-PCT/US2007/087812, International Searching Authority—European Patent Office—Aug. 29, 2008.
Written Opinion-PCT/US2007/087812; International Searching Authority—European Patent Office—Aug. 29, 2006.
Ghosh A, Love R, Whinnett N, Ratasuk R, Xiao WM, Kuchibhotla R. "Over view of enhanced uplink for 3GPPW-CDMA," VTC2004-Spring: 2004 IEEE 59th Vehicular Technology Conference, vol. S1-5, Proceedings pp. 2261-2265, May 17-19, 2004.
Taiwan Search Report-TW096148516—TIPO—Jun. 1, 2011.

\* cited by examiner

FAST STATE TRANSITION FOR A UE WITH RECONFIGURATION OVER PAGING

CLAIM OF PRIORITY UNDER 35 U.S.C. §119

The present Application for Patent claims priority to Provisional U.S. Application Ser. No. 60/870,580, entitled "RECONFIGURATION OVER PAGING FOR HSPA," filed Dec. 18, 2006, assigned to the assignee hereof, and expressly incorporated herein by reference.

BACKGROUND

I. Field

The present disclosure relates generally to communication, and more specifically to techniques for transitioning between operating states by a user equipment (UE) in a wireless communication network.

II. Background

A UE (e.g., a cellular phone) in a wireless communication network may operate in one of several operating states at any given moment. In an active state, the UE may be allocated resources by the wireless network and may actively exchange data with the wireless network, e.g., for a voice and/or data call. In an idle state, the UE may not be allocated resources by the wireless network and may monitor a paging channel for paging messages. The active and idle states may be referred to by different names in different systems. The UE may transition between the active and idle states based on data requirements of the UE. For example, the UE may transition to the active state whenever there is data to send or receive and may transition to the idle state after completing the data exchange with the wireless network.

The UE may exchange signaling with the wireless network in order to transition between operating states. The signaling may allocate resources to the UE and may configure various parameters to be used by the UE for communication with the wireless network. The signaling consumes network resources and delays data transmission. There is therefore a need in the art for techniques to efficiently transition between operating states by the UE.

SUMMARY

Techniques to support fast state transition for a UE by sending configuration information over paging are described herein. The UE may operate in a first state (e.g., a CELL_PCH state) in which the UE does not send or receive user data. The UE may monitor for paging messages while in the first state and may receive a paging message carrying first configuration information. The UE may transition from the first state to a second state (e.g., a CELL_DCH state) in response to receiving the paging message. The UE may determine a set of communication parameters based on the first configuration information received from the paging message and second configuration information stored at the UE. The UE may then exchange user data based on the set of communication parameters while in the second state. This may avoid the need to exchange signaling after receiving the paging message in order to obtain the first and/or second configuration information.

In one design, the first configuration information may include or indicate a set of physical channel parameters to use for communication. The set of physical channel parameters may include at least one Radio Network Temporary Identifier (RNTI) for the UE, at least one channelization code and/or at least one time offset for at least one physical channel, at least one signature sequence, a scrambling code, and/or some other physical channel parameters. The UE may exchange user data based on the set of physical channel parameters provided by the first configuration information.

In one design, the second configuration information may include or indicate a set of physical channel parameters, a set of transport channel parameters, a set of radio bearer parameters, a set of radio access bearer parameters, a set of security parameters, or any combination thereof. The UE may store the second configuration information when transitioning to the first state. The UE may also use default values for some communication parameters in order to reduce the amount of first configuration information to send in the paging message.

Various aspects and features of the disclosure are described in further detail below.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, etc. The terms "network" and "system" are often used interchangeably. A CDMA network may implement a radio technology such as Universal Terrestrial Radio Access (UTRA), cdma2000, etc. UTRA includes Wideband CDMA (W-CDMA) and other variants of CDMA. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16, IEEE 802.20, Flash-OFDM®, etc. UTRA, E-UTRA and GSM are part of Universal Mobile Telecommunication System (UMTS) and are described in documents from an organization named "3rd Generation Partnership Project" (3GPP). cdma2000 and UMB are described in documents from an organization named "3rd Generation Partnership Project 2" (3GPP2). 3GPP and 3GPP2 documents are publicly available. These various radio technologies and standards are known in the art. For clarity, certain aspects of the techniques are described below for UMTS, and UMTS terminology is used in much of the description below.

Figure 1:
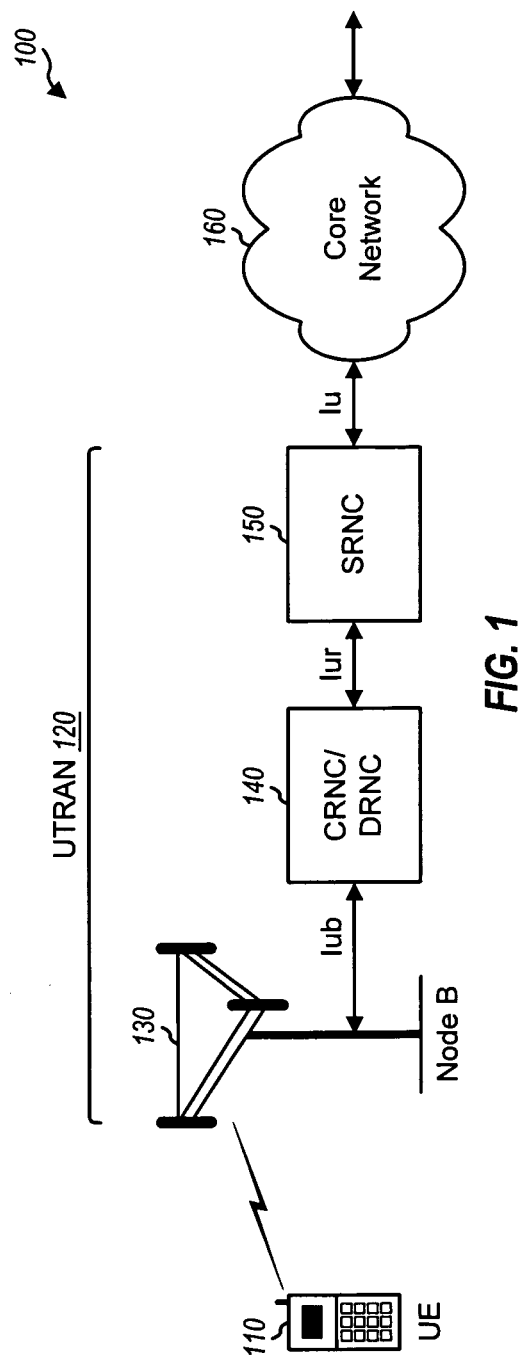
FIG. 1 shows a wireless communication network.

FIG. 1 shows a wireless communication network (e.g., a UMTS network) 100 that includes a Universal Terrestrial Radio Access Network (UTRAN) 120 and a core network 160. UTRAN 120 may include any number of Node Bs coupled to any number of Radio Network Controllers (RNCs). For simplicity, only one Node B 130, one controlling RNC/Drift RNC (CRNC/DRNC) 140, and one Serving RNC (SRNC) 150 are shown in FIG. 1. A Node B may also be referred to as an evolved Node B (eNode B), a base station, an access point, etc. Each Node B supports radio communication for UEs within its coverage area. The overall coverage area of a Node B may be partitioned into multiple (e.g., three) smaller areas. The term "cell" can refer to the smallest coverage area of a Node B and/or the Node B serving this coverage area, depending on the context in which the term is used. The terms "cell" and "Node B" are used interchangeably herein. A cell in UMTS may correspond to a sector in cdma2000 and other networks.

Each RNC may couple to a set of Node Bs via an Iub interface and may provide coordination and control for these Node Bs. For example, an RNC may perform radio resource management, some mobility management functions, and other functions to support communication between the UEs and the UTRAN. Each RNC may also couple to one or more other RNCs via an Iur interface and to core network 160 via an Iu interface. Core network 160 may include various network entities that may support circuit-switched (CS), packet-switched (PS), and other services for the UEs.

Network 100 may support communication for any number of UEs. For simplicity, only one UE 110 is shown in FIG. 1. A UE may also be referred to as a mobile station, an access terminal, a subscriber unit, a station, etc. A UE may be a cellular phone, a personal digital assistant (PDA), a wireless device, a wireless modem, a handheld device, a laptop computer, etc. UE 110 may communicate with Node B 130 via a radio link and with SRNC 150 via a Uu interface. SRNC 150 may serve UE 110 and may terminate both the Iu link for data exchanges and the corresponding signaling between UE 110 and core network 160. SRNC 150 may also terminate Radio Resource Control (RRC) signaling between UE 110 and UTRAN 120 and may perform management functions such as outer loop power control, load control, admission control, handover control, mobility management, etc. UE 110 may communicate directly with SRNC 150 (not shown in FIG. 1) or indirectly via CRNC/DRNC 140 (as shown in FIG. 1). CRNC/DRNC 140 may control Node B 130 with which UE 110 communicates and may perform functions such as macrodiversity combining and splitting, routing of data between UE 110 and SRNC 150, etc.

In UMTS, data is processed as one or more transport channels at Layer 2 (L2). The transport channels may carry data for one or more services, e.g., voice, video, packet data, etc. The transport channels include a Dedicated Channel (DCH), an Enhanced Dedicated Channel (E-DCH), a High Speed Downlink Shared Channel (HS-DSCH), a Broadcast Channel (BCH), a Forward Access Channel (FACH), a Paging Channel (PCH), and a Random Access Channel (RACH). The transport channels are mapped to physical channels at a physical layer (PHY) or Layer 1 (L1). The physical channels are channelized with different channelization codes and are orthogonal to one another in the code domain. The transport channels and physical channels are described in 3GPP TS 25.211, entitled "Physical channels and mapping of transport channels onto physical channels," May 2007.

The UE may communicate with the UTRAN via radio bearers (RBs), which are services provided by Layer 2 for transfer of user data between the UE and the UTRAN. The radio bearers may be established, reconfigured and released through RRC radio bearer procedures. The radio bearers may be configured with various parameters and may utilize transport channels and physical channels. The transport and physical channels may be configured with the radio bearer procedures and may also be configured separately with transport and physical channel procedures.

Figure 2:
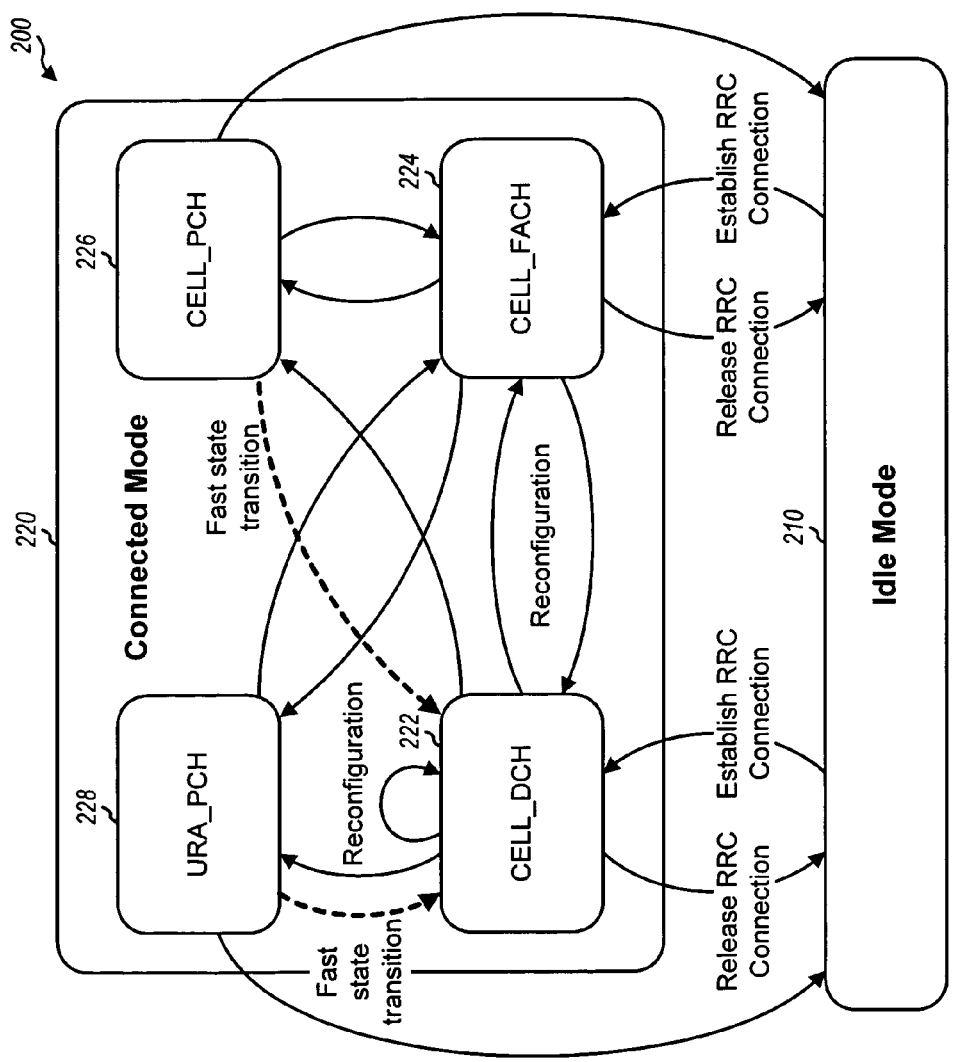
FIG. 2 shows a state diagram for a UE.

FIG. 2 shows a state diagram 200 of RRC states for the UE in UMTS. Upon being powered on, the UE may perform cell selection to find a suitable cell from which the UE can receive service. This cell is referred to as the serving cell. Thereafter, the UE may transition to an Idle mode 210 or a Connected mode 220 depending on whether there is any activity for the UE. In the Idle mode, the UE has registered with the core network, listens for paging messages, and updates its location with the core network when necessary. In the Connected mode, the UE may or may not be able to transmit and receive data depending on its RRC state and configuration. The UTRAN does not have the UE context in the Idle mode and has the UE context in the Connected mode.

The UE may perform an Establish RRC Connection procedure in order to transition from the Idle mode to the Connected mode. From this procedure, the UE may obtain the following:

Radio bearer parameters—parameters for radio bearers for the UE,

Radio access bearer parameters—parameters for radio access bearers for the UE,

Transport channel parameters—parameters for transport channels at Layer 2,

Physical channel parameters—parameters for physical channels at Layer 1, and Security parameters—parameters for ciphering and integrity protection for the UE.

The parameters above may be referred to as communication parameters. The physical channel parameters may also be referred to as PHY parameters, L1 parameters, etc. The transport channel parameters may also be referred to as Medium Access Control (MAC) parameters, L2 parameters, etc. The radio bearer parameters may also be referred to as upper layer parameters, etc. The Establish RRC Connection procedure and the various communication parameters given above are described in 3GPP TS 25.331, entitled "Radio Resource Control (RRC); Protocol Specification," September 2007.

In the Connected mode, the UE may be in one of four RRC states—a CELL_DCH state 222, a CELL_FACH state 224, a CELL_PCH state 226, and a URA_PCH state 228. The CELL_DCH state is characterized by (i) dedicated physical channels allocated to the UE for the downlink and uplink and (ii) a combination of dedicated and shared transport channels available to the UE. The CELL_FACH state is characterized by (i) no dedicated physical channels allocated to the UE, (ii) a default common or shared transport channel assigned to the UE for use to access the UTRAN, and (iii) the UE continually monitoring the FACH for signaling such as reconfiguration messages. The CELL_PCH and URA_PCH states are characterized by (i) no dedicated physical channels allocated to the UE, (2) the UE periodically monitoring the PCH for paging messages, and (iii) the UE not being permitted to transmit on the uplink. The location of the UE is known at the cell level in the CELL_PCH state and is known at a User Registration Area (URA) level in the URA_PCH state. A URA may include a set of cells. The UE may be paged via a specific cell in the CELL_PCH state and via all cells in a specific URA in the URA_PCH state. The RRC modes and states are described in the aforementioned 3GPP TS 25.331.

The UE may transition (i) from the Idle mode to the CELL_DCH or CELL_FACH state by performing an Establish RRC Connection procedure, and (ii) from the CELL_DCH or CELL_FACH state to the Idle mode by performing a Release RRC Connection procedure. While in the Connected mode, the UTRAN can command the UE to be in one of the four RRC states based on activity of the UE. The UE may transition (i) between the CELL_DCH and CELL_FACH states by performing a reconfiguration procedure, and (ii) between different configurations in the CELL_DCH state by also performing a reconfiguration procedure. The UE may transition from the CELL_DCH state to the CELL_PCH or URA_PCH state by performing a reconfiguration procedure. The UE may also transition from the CELL_FACH state to the CELL_PCH or URA_PCH state by performing a reconfiguration procedure. The UE may autonomously transition from the CELL_PCH or URA_PCH state to the CELL_FACH state upon receiving a paging message. These various procedures are described in the aforementioned 3GPP TS 25.331.

The UE and the SRNC may exchange RRC messages via the Uu interface. The SRNC and the CRNC/DRNC may exchange Radio Network Subsystem Application Part (RNSAP) messages via the Iur interface. The CRNC/DRNC and the Node B may exchange Node B Application Part (NBAP) messages via the Iub interface. The Uu interface and RRC messages and procedures are described in the aforementioned 3GPP TS 25.331. The Iur interface and RNSAP messages and procedures are described in 3GPP TS 25.423, entitled "UTRAN Iur interface RNSAP signaling," September 2007. The Iub interface and NBAP messages and procedures are described in 3GPP TS 25.433, entitled "UTRAN Iub interface Node B Application Part (NBAP) signaling," September 2007.

Figure 3:
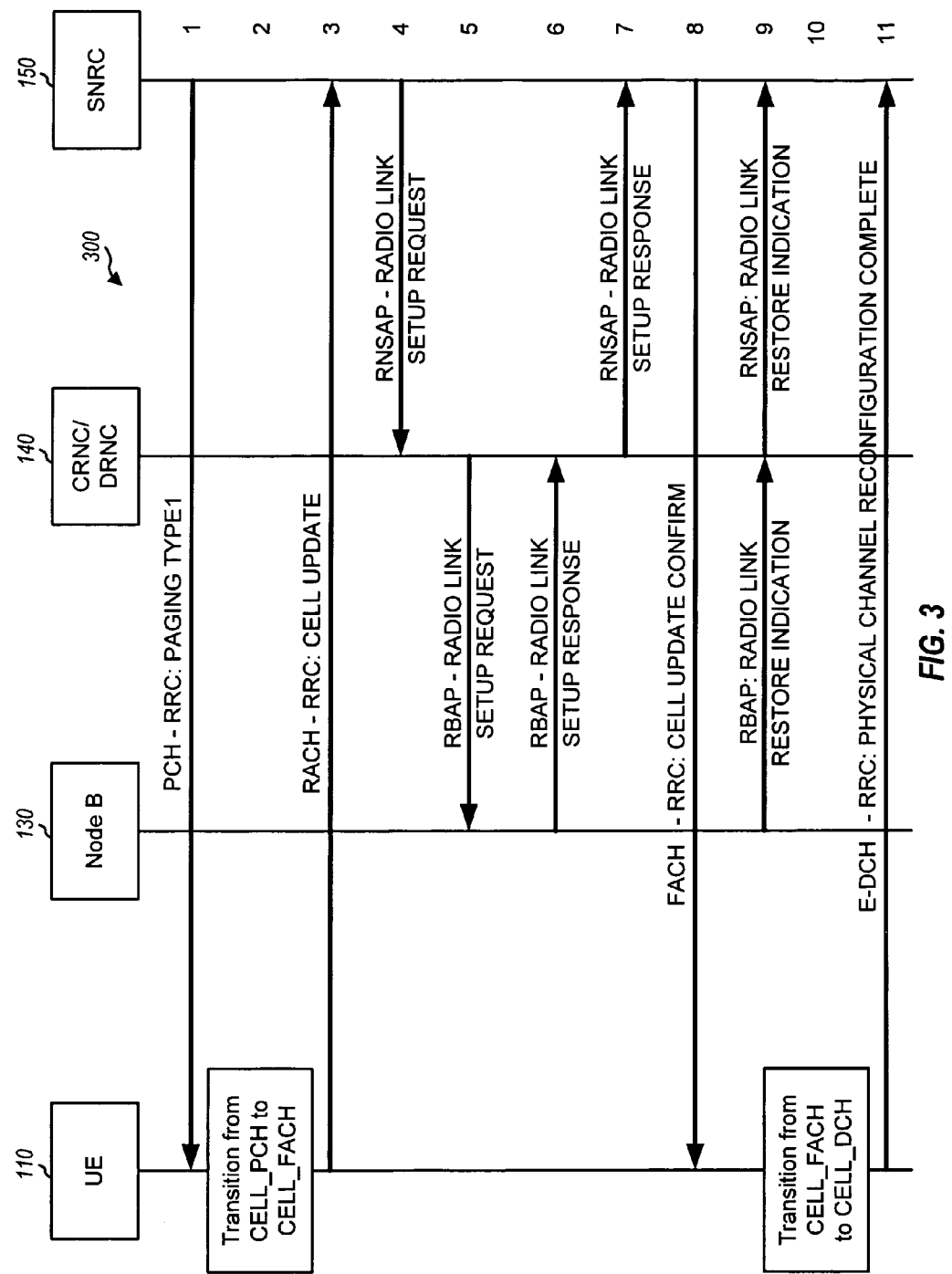
FIG. 3 shows a message flow for transition from CELL_PCH to CELL_DCH.

FIG. 3 shows a message flow 300 for a network-initiated procedure for normal transition from the CELL_PCH state to the CELL_DCH state. The UE may operate in the CELL_PCH state and may periodically monitor the PCH for paging messages. The UTRAN may page the UE by sending a PAGING TYPE 1 message from the SRNC via the Node B to the UE (step 1). The UE may autonomously transition from the CELL_PCH state to the CELL_FACH state upon receiving the PAGING TYPE 1 message (step 2). The UE may then send a CELL UPDATE message on the RACH to the Node B, which may forward the message to the SRNC (step 3). The CELL UPDATE message may include a UTRAN RNTI (U-RNTI) in order for the network to identify the UE. The SRNC may then send a RADIO LINK SETUP REQUEST message to the CRNC/DRNC to request establishment of a radio link by the CRNC/DRNC for the UE (step 4). The CRNC/DRNC may send a RADIO LINK SETUP REQUEST message to the Node B to request establishment of a radio link by the Node B for the UE (step 5). The Node B may allocate resources, configure a new radio link for the UE according to parameters given in the message received from the CRNC/DRNC, and return a RADIO LINK SETUP RESPONSE message to the CRNC/DRNC (step 6). The CRNC/DRNC may return a RADIO LINK SETUP RESPONSE message with pertinent parameters for the UE to the SRNC (step 7).

The SRNC may then send a CELL UPDATE CONFIRM message to the Node B, which may forward the message on the FACH to the UE (step 8). This message may include reconfiguration parameters that may be used for any radio bearer reconfiguration procedure. The Node B may send a RADIO LINK RESTORE INDICATION message to the CRNC/DRNC, which may in turn send a RADIO LINK RESTORE INDICATION message to the SRNC (step 9).

The UE may transition from the CELL_FACH state to the CELL_DCH state upon receiving the CELL UPDATE CONFIRM message (step 10). The UE may perform uplink synchronization and may send a PHYSICAL CHANNEL RECONFIGURATION COMPLETE message on the E-DCH to the Node B, which may forward the message to the SRNC (step 11). The UE may thereafter exchange (e.g., transmit and/or receive) user data via the established radio link.

In message flow 300, the UE first transitions from the CELL_PCH state to the CELL_FACH state and then transitions from the CELL_FACH state to the CELL_DCH state. In the CELL_FACH state, messages are sent on the RACH by the UE and on the FACH to the UE. The RACH and FACH are common transport channels that are shared by different UEs. It is desirable to reduce state transition delays when the UE is in the Connected mode. This may improve radio resource utilization and extend battery life for the UE, especially for applications characterized by intermittent data exchanges and tight latency requirements such as Web browsing, Push-to-Talk, etc.

In an aspect, fast state transition from the CELL_PCH state to the CELL_DCH state may be achieved by incorporating reconfiguration function in a paging message. The may allow the UE to transition directly from the CELL_PCH state to the CELL_DCH state after receiving the paging message. The fast state transition may reduce overhead as well as latency.

Figure 4:
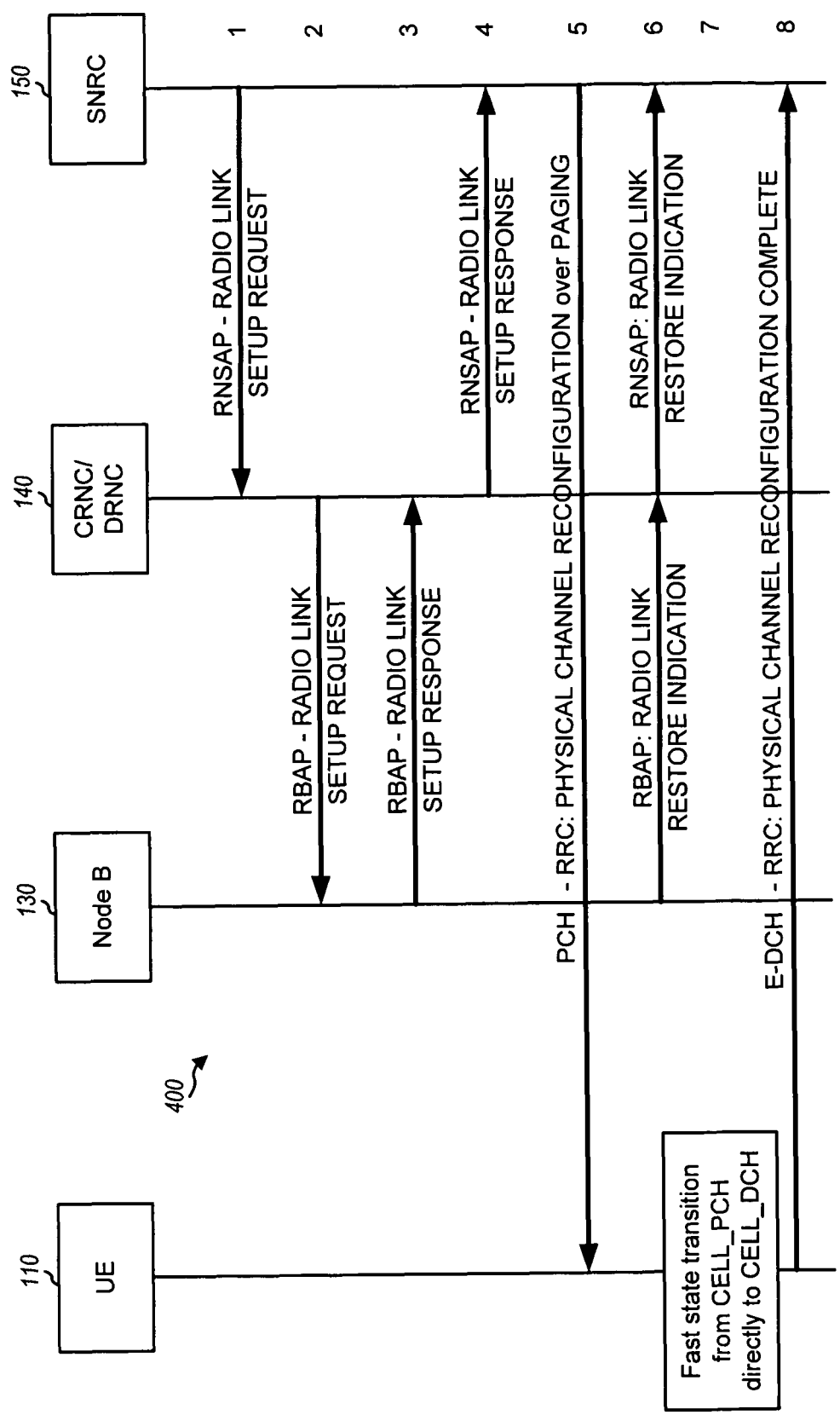
FIG. 4 shows a message flow for fast transition from CELL_PCH to CELL_DCH.

FIG. 4 shows a design of a message flow 400 for a network-initiated procedure for fast state transition from the CELL_PCH state to the CELL_DCH state. The UE may operate in the CELL_PCH state and may periodically monitor the PCH for paging messages. The UTRAN may desire to page the UE and may first establish pertinent network bearers, e.g., Iub and Iur. The SRNC may send a RADIO LINK SETUP REQUEST message to the CRNC/DRNC to request establishment of a radio link by the CRNC/DRNC for the UE (step 1). The CRNC/DRNC may then send a RADIO LINK SETUP REQUEST message to the Node B to request establishment of a radio link by the Node B for the UE (step 2). The Node B may allocate resources, configure a new radio link for the UE, and return a RADIO LINK SETUP RESPONSE message to the CRNC/DRNC (step 3). The CRNC/DRNC may return a RADIO LINK SETUP RESPONSE message with pertinent parameters to the SRNC (step 4).

The SRNC may then send a PHYSICAL CHANNEL RECONFIGURATION message within a paging message to the UE (step 5). The PHYSICAL CHANNEL RECONFIGURATION message may include various physical channel parameters as described below. The Node B may send a RADIO LINK RESTORE INDICATION message to the CRNC/DRNC, which may in turn send a RADIO LINK RESTORE INDICATION message to the SRNC (step 6).

The UE may transition from the CELL_PCH state directly to the CELL_DCH state upon receiving the PHYSICAL CHANNEL RECONFIGURATION message (step 7). The UE may perform uplink synchronization and then send a PHYSICAL CHANNEL RECONFIGURATION COMPLETE message on the E-DCH to the Node B, which may forward the message to the SRNC (step 8). The UE may thereafter exchange user data via the established radio link.

In the design shown in FIG. 4, fast state transition is achieved by performing reconfiguration over paging. In general, any set of parameters may be reconfigured over paging. In one design, only a set of physical channel parameters is reconfigured over paging, which may reduce overhead in sending the parameters. In this design, the UE may store the radio bearer parameters and the transport channel parameters upon transitioning to the CELL_PCH state. Establishment/reconfiguration of these stored parameters may then be avoided. To further reduce overhead, only certain UE-specific physical channel parameters may be sent over paging, and default values may be used for remaining physical channel parameters. In general, all or a subset of the physical channel parameters may be explicitly sent to the UE via paging.

The techniques described herein may be used for any mapping of the PCH to physical channel. For example, the PCH may be sent on a Secondary Common Control Physical Channel (S-CCPCH), which is broadcast to all UEs. The PCH may also be sent on a High Speed Physical Downlink Shared Channel (HS-PDSCH), which may be sent to specific UEs.

The techniques described herein may also be used to send configuration information for any set of physical channels. For clarity, configuration information is sent for physical channels used for High-Speed Downlink Packet Access (HS-DPA) and High-Speed Uplink Packet Access (HSUPA), which are collectively referred to as High-Speed Packet Access (HSPA). HSDPA and HSUPA are sets of channels and procedures that enable high-speed packet data transmission on the downlink and uplink, respectively. Table 1 lists some physical channels in UMTS, including some used for HSDPA and HSUPA. These physical channels are described in the aforementioned 3GPP TS 25.211.

TABLE 1

Physical channels

| | Channel | Channel Name | Description |
|---|---|---|---|
| | Downlink DPCH | Dedicated Physical Channel | Carry data and signaling for a specific UE. |
| | F-DPCH | Fractional Dedicated Physical Channel | Carry L1 control information (TPC commands) for different UES. |
| HSDPA | HS-SCCH (Downlink) | Shared Control Channel for HS-DSCH | Carry format information for packets sent on the HS-PDSCH. |
| | HS-PDSCH (Downlink) | High Speed Physical Downlink Shared Channel | Carry packets sent on the downlink to different UEs. |
| | HS-DPCCH (Uplink) | Dedicated Physical Control Channel for HS-DS | Carry ACK/NAK for packets sent on the HS-PDSCH and channel quality indicator (CQI). |
| HSUPA | E-DPCCH (Uplink) | E-DCH Dedicated Physical Control Channel | Carry signaling for the E-DPDCH. |
| | E-DPDCH (Uplink) | E-DCH Dedicated Physical Data Channel | Carry packets sent on the uplink by a UE. |
| | E-HICH (Downlink) | E-DCH Hybrid ARQ Indicator Channel | Carry ACK/NAK for packets sent on the E-DPDCH. |
| | E-AGCH (Downlink) | E-DCH Absolute Grant Channel | Carry absolute grants of resources for the E-DPDCH. |
| | E-RGCH (Downlink) | E-DCH Relative Grant Channel | Carry relative grants of resources for the E-DPDCH. |

For HSDPA, the UE may be configured for either HS-SCCH operation or HS-SCCH-less operation. For HS-SCCH operation, signaling is sent on the HS-SCCH prior to packet transmission on the HS-PDSCH. The UE may monitor up to four 128-chip channelization codes for the HS-SCCH to detect for signaling. The UE may process up to fifteen 16-chip channelization codes for the HS-PDSCH to receive data. For HS-SCCH-less operation, signaling is not sent on the HS-SCCH, and the UE may process the HS-PDSCH based on preconfigured parameters. A default HSDPA configuration may be used for the UE. This default configuration may includes L channelization codes for the HS-SCCH and M channelization codes for the HS-PDSCH, where $1 \leq L \leq 4$ and $1 \leq M \leq 15$.

Various physical channel parameters may be sent in a paging message to support physical channel reconfiguration over paging. In one design, the paging message may carry one or more of the physical channel parameters given in Table 2.

TABLE 2

Physical channel parameters

| Parameter | Size | Description |
|---|---|---|
| H-RNTI | 16 bits | High-speed RNTI used as the UE identity for HSDPA. |
| Primary E-RNTI | 16 bits | Enhanced RNTI used as the UE identity for HSUPA. |
| C-RNTI | 16 bits | Cell RNTI used as the UE identity for a specific cell in the CELL_FACH state. |
| Default DPCH Offset | 10 bits | Time offset of the DPCH for the UE. |
| Uplink Scrambling Code | 24 bits | Code used by the UE to scramble data sent on the uplink. |
| HS-SCCH Code Information | 7X bits | For HS-SCCH operation, L HS-SCCH codes may be sent using 7 bits per HS-SCCH code. For HS-SCCH-less operation, M HS-PDSCH codes may be sent using 7 bits per HS-PDSCH code. |
| F-DPCH Information | 16 bits | Include 8 bits for a channelization code for the F-DPCH and 8 bits for a frame offset assigned to the UE. |
| E-HICH Information | 13 bits | Include 7 bits for a channelization code for the E-HICH and 6 bits for a signature sequence for the UE. |
| Grant Information | 0 or 14 bits | For unscheduled configuration, the UE can send small amount of data on pre-assigned resources, and no grant (0 bits) is sent. For scheduled configuration, a channelization code for the E-AGCH (8 bits) and a signature sequence for the E-RGCH (6 bits) are sent. |

The HS-SCCH code information may be for a default HSDPA configuration with fewer than four HS-SCCH codes and one HS-PDSCH code. This may reduce the number of bits to send for the HS-SCCH code information.

Table 2 gives an example set of physical channel parameters that may be sent in a paging message. Other physical channel parameters may also be sent in a paging message. The physical channel parameters may be sent as information elements (IEs) in a PHYSICAL CHANNEL RECONFIGURATION message, which may be carried in a paging message. A different IE may be used for each physical channel parameter.

In general, the physical channel parameters for the UE may be provided by one or more network entities. The SRNC may obtain all of the physical channel parameters for the UE from the appropriate network entities and may then send these parameters in a paging message to the UE.

The H-RNTI may be assigned to the UE by the CRNC/DRNC. The CRNC/DRNC may send the H-RNTI to the Node B via a RADIO LINK SETUP REQUEST message and to the SRNC via a RADIO LINK SETUP RESPONSE message.

The primary E-RNTI may be assigned to the UE by the Node B and reported to the CRNC/DRNC via a RADIO LINK SETUP RESPOSSE message. The CRNC/DRNC may forward the primary E-RNTI to the SRNC via a RADIO LINK SETUP RESPONSE message.

The C-RNTI may be assigned to the UE by the CRNC/DRNC via a cell update procedure, which may be performed whenever the UE changes cell due to mobility. The CRNC/DRNC may report the C-RNTI to the SRNC via an UPLINK SIGNALLING TRANSFER INDICATION message whenever the cell update procedure is performed.

The HS-SCCH code information for the UE may be provided by the Node B. The CRNC/DRNC may configure the Node B with a set of HS-SCCH codes to be used for HS-DSCH operation and may send this HS-SCCH code set via a PHYSICAL SHARED CHANNEL RECONFIGURATION REQUEST message. The Node B may assign up to four HS-SCCH codes to the UE when for HS-SCCH operation. Node B may report the assigned HS-SCCH code(s) to the CRNC/DRNC via a RADIO LINK SETUP RESPONSE message. The CRNC/DRNC may forward this information to the SRNC via a RADIO LINK SETUP RESPONSE message.

The F-DPCH information for the UE may be provided by the SRNC and the CRNC/DRNC. The SRNC may configure the F-DPCH offset and power settings in the Node B and may send these parameters to the CRNC/DRNC via a RADIO LINK SETUP REQUEST message. The CRNC/DRNC may allocate the channelization code for the F-DPCH and configure the Node B with the F-DPCH settings (e.g., the frame offset, channelization code, and transmit power) for the UE. The CRNC/DRNC may report the F-DPCH code to the SRNC via a RADIO LINK RESPONSE message.

The E-HICH information for the UE may be provided by the Node B. The Node B may assign the E-HICH code and signature sequence to the UE and may report these parameters to the DRNC/CRNC via a RADIO LINK SETUP RESPONSE message. The CRNC/DRNC may forward this information to the SRNC via a RADIO LINK SETUP RESPONSE message.

The grant information for the UE may be provided by the Node B. The Node B may assign the E-AGCH code and the E-RGCH signature sequence to the UE and may report these parameters to the CRNC/DRNC via a RADIO LINK SETUP RESPONSE message. The CRNC/DRNC may forward the information to the SRNC via a RADIO LINK SETUP RESPONSE message.

Figure 5:
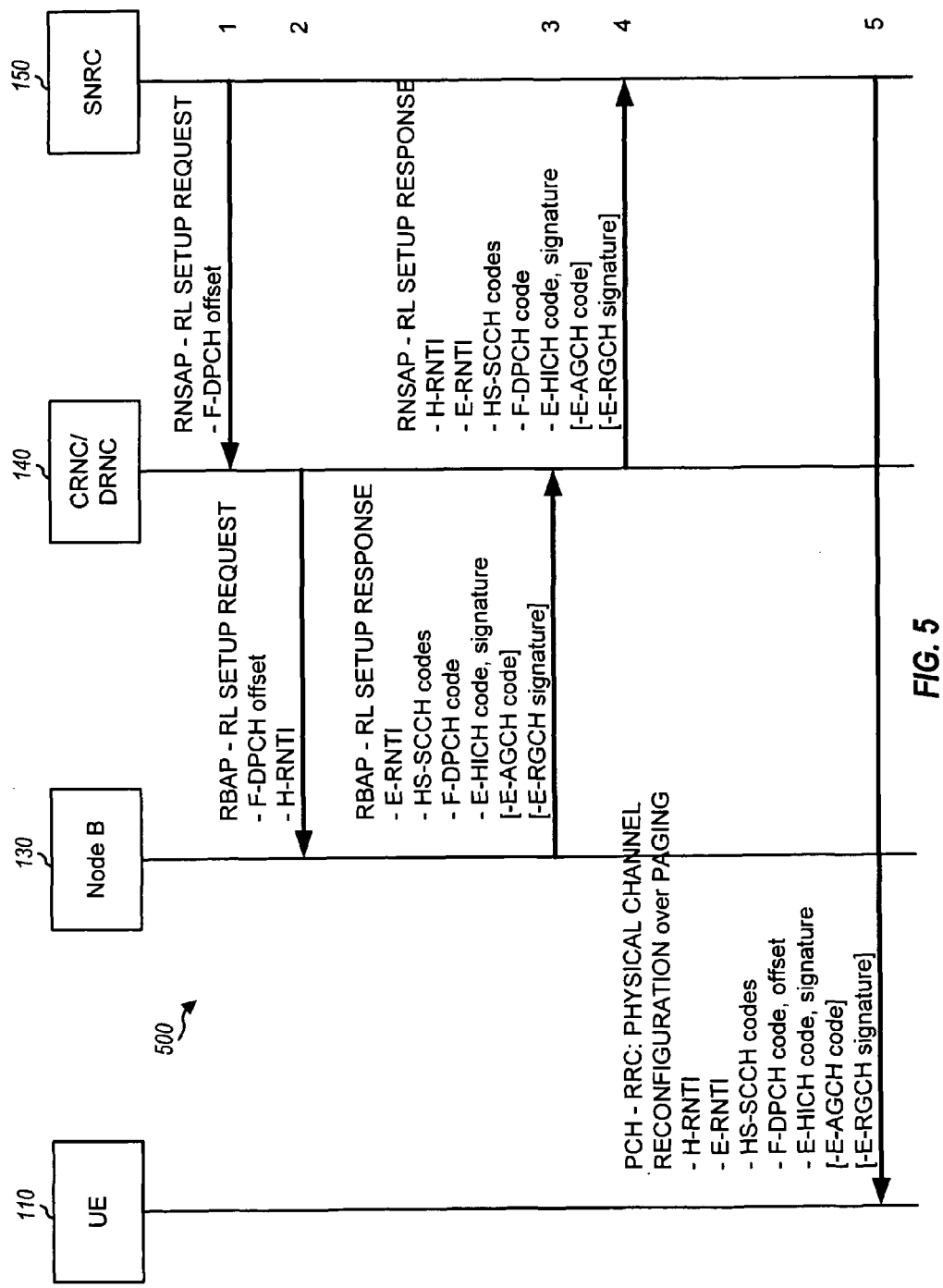
FIG. 5 shows a message flow for obtaining physical channel parameters for the UE.

FIG. 5 shows a design of a message flow 500 for obtaining physical channel parameters for the UE for reconfiguration over paging. Message flow 500 includes steps 1 through 5 of message flow 400 in FIG. 4 but focuses on the collection of the physical channel parameters for the UE.

The UTRAN may desire to page the UE and may first determine pertinent physical channel parameters for the UE. The SRNC may configure the F-DPCH offset and send it in a RADIO LINK SETUP REQUEST message to the CRNC/DRNC (step 1). The CRNC/DRNC may assign the H-RNTI to the UE and send the H-RNTI and the F-DPCH offset to the Node B via a RADIO LINK SETUP REQUEST message (step 2). The Node B may assign the primary E-RNTI, the HS-SCCH code(s), the F-DPCH code, the E-HICH code and signature sequence, and the E-AGCH code and E-RGCH signature sequence (for scheduled configuration) to the UE. The Node B may then send these parameters in a RADIO LINK SETUP RESPONSE message to the CRNC/DRNC (step 3). The CRNC/DRNC may then send the H-RNTI assigned by the CRNC/DRNC as well as the primary E-RNTI, the HS-SCCH code(s), the F-DPCH code, the E-HICH code and signature sequence, and the E-AGCH code and E-RGCH signature sequence assigned by the Node B in a RADIO LINK SETUP RESPONSE message to the SRNC (step 4). The SRNC may then send all of the physical channel parameters in a PHYSICAL CHANNEL RECONFIGURATION message, which may be carried in a paging message sent to the UE (step 5).

In the design described above and shown in FIG. 5, the physical channel parameters for the UE are assigned partly by the SRNC, partly by the CRNC/DRNC, and partly by the Node B. Therefore, the SRNC may first set up Iub/Iur bearers and collect these physical channel parameters for the UE. FIG. 5 shows a specific design for collecting physical channel parameters for the UE using specific messages in UMTS. The physical channel parameters may also be collected in other manners, e.g., from different network entities, using different messages, etc.

As noted above, only a small set of physical channel parameters may be sent to the UE in a PHYSICAL CHANNEL RECONFIGURATION message over a paging message. Default values may be used for remaining physical channel parameters in order to reduce overhead. The default values may be defined in various manners.

In one design, the UE may store certain physical channel parameters used previously by the UE in the CELL_DCH state. For example, an uplink scrambling code may be assigned to the UE when the UE enters the CELL_DCH state. Instead of discarding this uplink scrambling code when leaving the CELL_DCH state, as is normally done, the UE may store this uplink scrambling code upon transitioning to the CELL_PCH state. Thereafter, when performing fast state transition from the CELL_PCH state to the CELL_DCH state, the UE may reuse the stored uplink scrambling code. By retaining and reusing the uplink scrambling code, signaling of a new uplink scrambling code may be avoided. In general, the UE may store any physical channel parameters for later use by the UE.

In another design, one or more predefined configurations may be available. Each predefined configuration may be associated with specific values for a set of physical channel parameters. The available predefined configurations may be provided to the UE (i) via system information that may be broadcast to all UEs, (ii) via dedicated signaling sent to the UE, and/or (iii) via some other means. The paging message may then include a pointer or an index for one of the predefined configurations. The same set of predefined configurations may be used by all Node Bs or by a group of Node Bs (e.g., in a URA). Alternatively, each Node B may be associated with a set of predefined configurations applicable for only that Node B.

The default values may also be provided in other manners. The default values may also be provided based on a combination of the designs described above. For example, certain physical channel parameters (e.g., those assigned by the CRNC/DRNC and/or SRNC) may be associated with default values used previously by the UE in the CELL_DCH state, and other physical channel parameters (e.g., those assigned by the Node B) may be provided via predefined configurations.

The techniques described herein may be used for fast state transition from the CELL_PCH state to the CELL_DCH state. In the CELL_PCH state, the location of the UE is known at the cell level. The SRNC may set up Iub/Iur bearers for only the Node B for the cell in which the UE is currently registered, e.g., as described above for FIG. 5.

The techniques may also be used for fast state transition from the URA_PCH state to the CELL_DCH state. In the URA_PCH state, the location of the UE is known at the URA level. To page the UE, the SRNC may set up Iub/Iur bearers for all Node Bs in the URA in which the UE is currently registered. To support fast state transition, one or more predefined configurations applicable for all Node Bs in the URA may be defined. One predefined configuration may then be used for the UE for fast URA_PCH to CELL_DCH state transition. The RNC may pre-book or reserve resources at the Node Bs for HSPA for a certain number of UEs while keeping alive the corresponding Iub/Iur bearers. The RNC may use one of the pre-booked resources to perform fast reconfiguration for the UE.

As noted above, various physical channel parameters may be sent to the UE for fast state transition. Table 3 lists some physical channel parameters that may be sent in a PHYSICAL CHANNEL RECONFIGURATION message. The "Category" column indicates whether a parameter is specific to a cell or common to a URA. The "Sent in Page" column identifies physical channel parameters that may be sent in a paging message in accordance with one design. This design assumes that (i) a UTRAN single UE identity (U-RNTI) is used in paging type 1 part, (ii) only HSPA configuration is used and therefore only the F-DPCH is configured for the downlink, (iii) only the HSPA serving radio link is established, (iv) no frequency re-direction is performed, (v) the reconfiguration procedure is performed with an activation time of "now", and (vi) ciphering and integrity protection are not applied to the paging message. Integrity protection and ciphering may be applied, e.g., by using a message authentication code to let the UE know that the paging message is intended for the UE. This may avoid the need to send the 32-bit U-RNTI in the paging message.

TABLE 3

Physical channel parameters

| Parameter/IE | Description | Sent in Page | Category |
|---|---|---|---|
| Integrity Check Info | Message authentication code and RRC sequence number (SN). | Yes | URA |
| Integrity Protection Mode Info | Only used in case of SRNS relocation. If UE is receiving paging in the URA, then SRNS relocation may not be performed. | No | N/A |
| Ciphering Mode Info | Only used in case of SRNS relocation. | No | N/A |
| Activation time | May be omitted. The procedure may assume an activation time of "Now". | No | Cell |
| Delay Restriction Flag | Additional information to Activation Time | No | URA |
| U-RNTI | Only used in case of SRNS relocation. | No | N/A |
| C-RNTI, H-RNTI and E-RNTI | These RNTIs are not stored in the UE in the URA_PCH state. The UE does not use the C-RNTI in the CELL_DCH state but uses the C-RNTI upon entering the CELL_FACH state, e.g., due to radio link failure or UE mobility. The C-RNTI may be omitted, e.g., if the UE does not operate in the CELL_FACH state. | Yes | Cell |
| RRC State Indicator | It should say "CELL_DCH". May be implicitly indicated by the presence of reconfiguration in the paging message | Yes (but implicit) | URA |
| UTRAN DRX Cycle Length Coefficient | Only used for the CELL/URA_PCH state. | No | N/A |
| CN Information Info | CN would not be updated. | No | N/A |
| URA identity | Only used for the URA_PCH state | No | N/A |
| Downlink Counter Synchronization Info | Only used in case of SRNS relocation. | No | N/A |
| Frequency Info | May be present in case of frequency re-direction and may be omitted otherwise. | Yes | Cell |
| Maximum allowed uplink TX power | Previously allocated value is stored in the UE in the URA_PCH state. May be updated by System Information Block 4 (SIB4). | Yes | Cell |
| Uplink DPCH Info | See Table 4. | Yes | Cell |

TABLE 3-continued

Physical channel parameters

| Parameter/IE | Description | Sent in Page | Category |
|---|---|---|---|
| E-DCH Info | See Table 5. | Yes | Cell |
| Downlink HS-PDSCH Information | See Table 6. | Yes | Cell |
| Downlink information common for all radio links | See Table 7. | Yes | Cell |
| Downlink information for each radio link | See Table 9. | Yes | Cell |

Table 4 lists some parameters that may be sent for the uplink DPCH information. The last column indices whether a given parameter may be sent in a paging message or whether a default value may be used for the parameter.

TABLE 4

Uplink DPCH Info

| Parameter/IE | Description | Sent in Page |
|---|---|---|
| Uplink DPCH power control info | Optional IE used by the UE to set initial DPCH power to use for closed loop power control. Default value may be used. | No (default) |
| Scrambling code type | Indicate short or long scrambling code. Default type may be assumed. | No (default) |
| Scrambling code number | 24-bit scrambling code assigned by the SRNC and may be added to a cell-specific part of a paging message. | Yes |
| Number of DPDCH | N/A (only E-DCH is configured) | No |
| Spreading factor | N/A (only E-DCH is configured) | No |
| TFCI existence | Default value may be used. | No (default) |
| Number of FBI bits | Default value may be used. | No (default) |
| Puncturing Limit | N/A (only E-DCH is configured) | No |

Table 5 lists some parameters that may be sent for the E-DCH information.

TABLE 5

E-DCH Info

| Parameter/IE | Description | Sent in Page |
|---|---|---|
| MAC-es/e reset indicator | No need to reset the MAC. This will not be included in the "default configurations". | No |
| E-DPCCH info | Optional IE to set E-DPCCH/DPCCH power offset, Happy bit delay condition. Default value may be used. | No (default) |
| E-DPDCH info | Optional IE to set E-TFCI table index, minimum set E-TFCI, reference E-TFCIs, and maximum channelization codes. One or more default values may be used for scheduling information configuration. | No (default) |
| Scheduled transmission configuration | One or more default values may be used. | No (default) |

Table 6 lists some parameters that may be sent for the downlink HS-PDSCH information.

TABLE 6

Downlink HS-PDSCH Info

| Parameter/IE | Description | Sent in Page |
|---|---|---|
| HS-SCCH Info | Default value may be used for downlink scrambling code | No (default) |
| | HS-SCCH channelization code information is assigned by the Node B. There may be pre-agreement between the RNC and Node B on usage of a set of channelization codes for quick reconfigurations, and this information may be sent by the RNC in a paging message to the UE. | Yes |
| Measurement Feedback Info | Default value may be used. | No (default) |

Table 7 lists some parameters that may be sent for downlink information common for all radio links (RL).

TABLE 7

Downlink information common for all radio links

| Parameter/IE | Description | Sent in Page |
|---|---|---|
| Downlink DPCH info common for all RL | Not needed for pure HSPA operation with F-DPCH. Downlink DPCH should not be configured. | No |
| Downlink F-DPCH info common for all RL | See Table 8. | |
| DPCH compressed mode info | Default value may be assumed. | No |
| TX diversity mode | Default value may be assumed. | No |
| Default DPCH offset value | This IE is an offset from system frame number to define the start timing of CFN cycle. A default value may be used for this. In HSPA operation, only the F-DPCH offset may be pertinent. | No (default) |
| MAC-hs reset indication | Not needed. | No |
| Post-verification period | Default value may be assumed. | No (default) |

Table 8 lists some parameters that may be sent for downlink F-DPCH information common for all radio links.

TABLE 8

Downlink F-DPCH information common for all radio links

| Parameter/IE | Description | Sent in Page |
|---|---|---|
| Timing Indication | This is used only for hard handover. | No |
| Timing maintained synchronization indication | Not needed. Synchronization procedure needs to be executed. | No |
| Downlink F-DPCH power control information | Default value may be assumed. | No (default) |
| TPC command error rate target | Default value may be assumed. | No (default) |

Table 9 lists some parameters that may be sent for downlink information for each radio link.

TABLE 9

Downlink information for each radio link

| Parameter/IE | Description | Sent in Page |
|---|---|---|
| Primary CPICH info | Not needed. The serving radio link is the cell where the UE shows up. | No |
| Cell ID | Not needed. May be provided in SIB4. | No |
| Serving HS-DSCH radio link indicator | Not needed. When the UE shows up in a cell, this cell may be assumed to be the serving cell. | No |
| Serving E-DCH radio link indicator | Not needed. When the UE shows up in a cell, this cell may be assumed to be the serving cell. | No |
| Downlink DPCH info for each radio link | Not needed in pure HSPA operation with F-DPCH. | No |
| Downlink F-DPCH info for each radio link | Primary CPICH usage for channel estimation IE - use default value. F-DPCH offset (8 bits) - send in page. Secondary CPICH info - use default value. Secondary scrambling code - use default value. Code number (8 bits) - send in page. TPC combination index - use default value. STTD indication - use default value. | |
| E-AGCH Info | Channelization code (8 bits). | Yes |
| E-HICH Info | Channelization code (7 bits). Signature sequence (6 bits). | Yes |
| E-RGCH Info | Signature sequence (6 bits). Relative grant (RG) combination index (3 bits). | Yes |

Figures 6, 7:
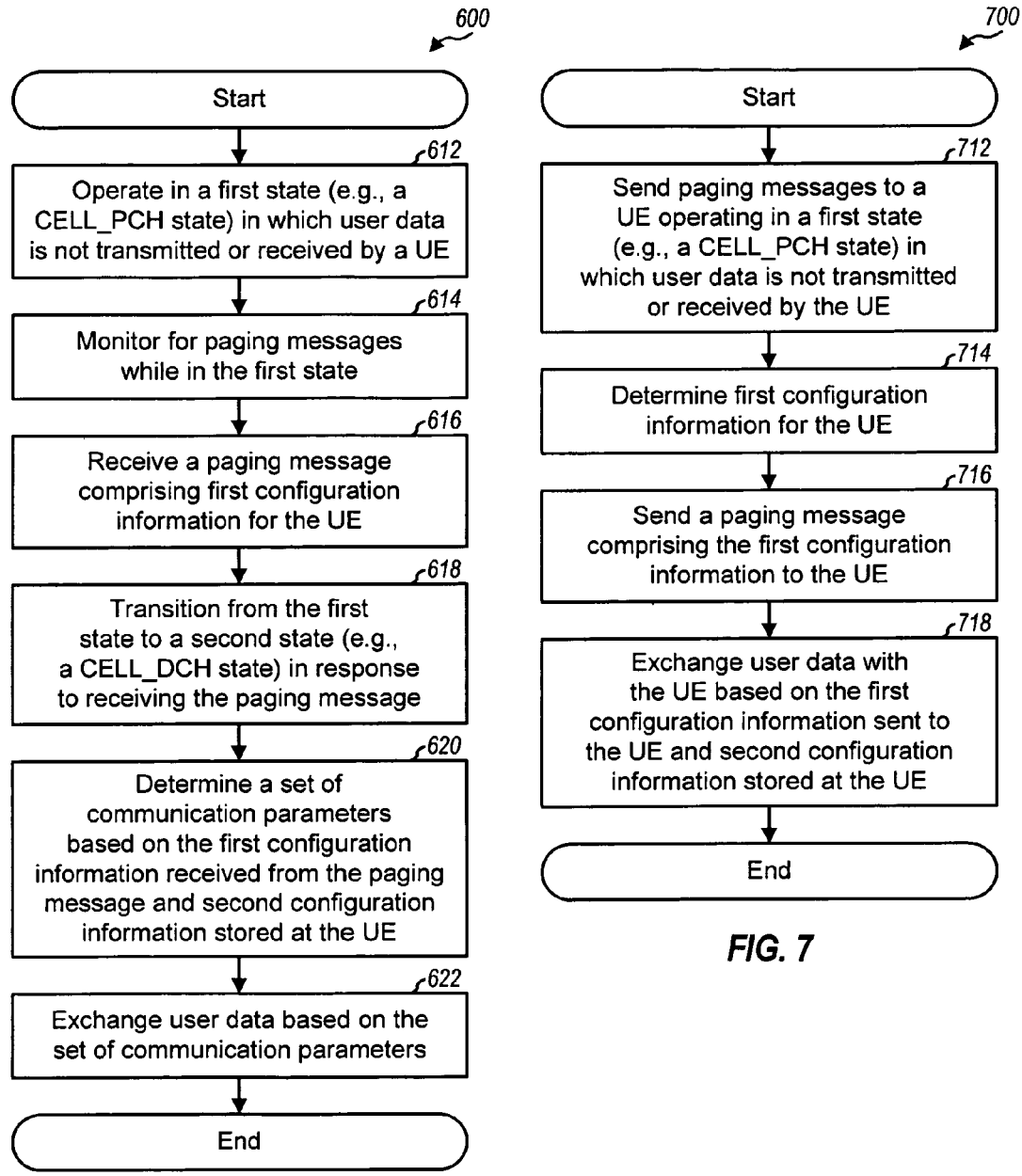
FIG. 6 shows a process performed by the UE for fast state transition.
FIG. 7 shows a process performed by an SRNC to support fast state transition.

FIG. 6 shows a design of a process 600 performed by the UE for fast state transition. The UE may operate in a first state (e.g., the CELL_PCH or URA_PCH state) in which user data is not transmitted or received by the UE (block 612). The UE may monitor for paging messages (e.g., with discontinuous reception (DRX)) while in the first state (block 614). The UE may receive a paging message comprising first configuration information for the UE (block 616). The UE may transition from the first state to a second state (e.g., the CELL_DCH state) in response to receiving the paging message (block 618). The UE may send a response for the paging message on a dedicated transport channel (e.g., the E-DCH) instead of a shared transport channel (e.g., the RACH).

The UE may determine a set of communication parameters based on the first configuration information received from the paging message and second configuration information stored at the UE (block 620). The first configuration information may include a set of physical channel parameters. Alternatively, the first configuration information may include an identifier or index of a predefined configuration associated with the set of physical channel parameters. In this case, the UE may obtain the set of physical channel parameters from system information received from a cell or via some other means. In any case, the set of physical channel parameters obtained from the first configuration information may include at least one RNTI for the UE, at least one channelization code for at least one physical channel, at least one time offset for at least one physical channel, at least one signature sequence, a scrambling code, some other physical channel parameters, or a combination thereof. The UE may also obtain a set of physical channel parameters, a set of transport channel parameters, a set of radio bearer parameters, a set of radio access bearer parameters, a set of security parameters, or any combination thereof, from the second configuration information stored at the UE. The UE may exchange user data based on the set of communication parameters (block 622).

The UE may store the second configuration information when transitioning to the first state. The UE may also use default values for some parameters in order to reduce the amount of first configuration information to send in the paging message.

For UMTS, the UE may receive the paging message on the PCH, which may be sent via the S-CCPCH or HS-PDSCH. The UE may receive from the paging message a PHYSICAL CHANNEL RECONFIGURATION message carrying the first configuration information.

FIG. 7 shows a design of a process 700 performed by the SRNC (or an equivalent network entity) to support fast state transition by the UE. The SRNC may send paging messages to the UE operating in a first state (e.g., the CELL_PCH or URA_PCH state) in which user data is not transmitted or received by the UE (block 712). The SRNC may desire to page the UE and may determine first configuration information for the UE (block 714). The SRNC may send a paging message comprising the first configuration information to the UE (block 716). The paging message may cause the UE to transition from the first state to a second state (e.g., the CELL_ DCH state). The SRNC may exchange user data with the UE based on the first configuration information sent to the UE and second configuration information stored at the UE (block 718).

For block 714, the SRNC may obtain a set of physical channel parameters for the UE from the Node B and/or may obtain at least one physical channel parameter for the UE from the CRNC/DRNC. The SRNC may then provide the set of physical channel parameters from the Node B and/or the at least one physical channel parameter from the CRNC/DRNC in the first configuration information sent to the UE. The UE may exchange user data based on the set of physical channel parameters from the Node B and/or the at least one physical channel parameter from the CRNC/DRNC.

Figure 8:
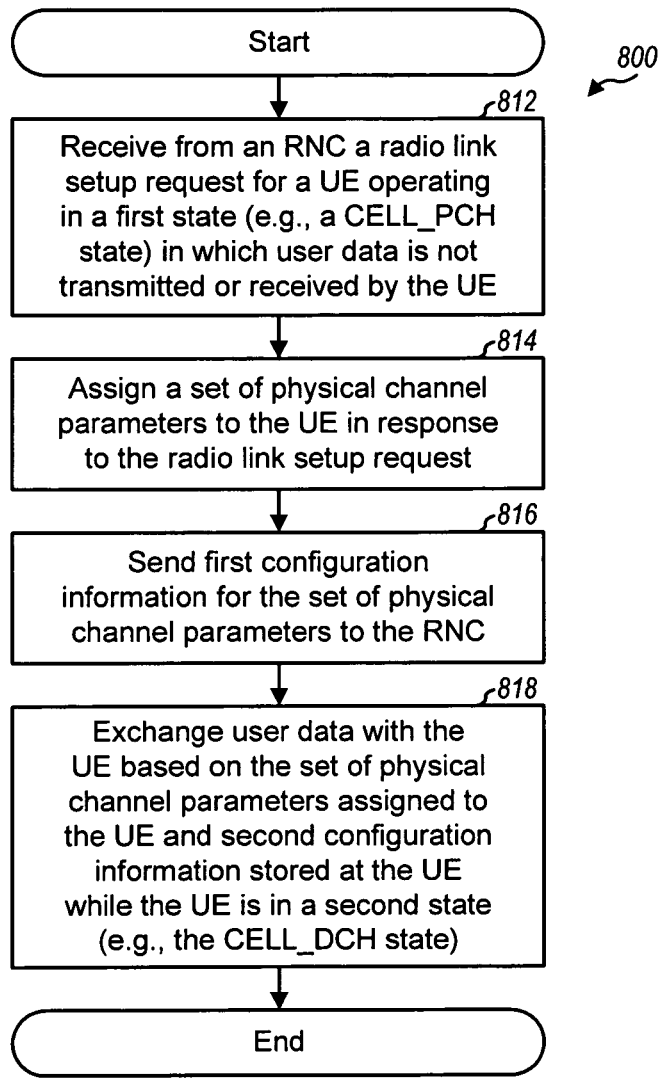
FIG. 8 shows a process performed by a Node B to support fast state transition.

FIG. 8 shows a design of a process 800 performed by the Node B to support fast state transition by the UE. The Node B may receive from an RNC a radio link setup request for the UE operating in a first state (e.g., the CELL_PCH or URA_PCH state) in which user data is not transmitted or received by the UE (block 812). The RNC may be a CRNC/DRNC, an SRNC, or an equivalent network entity. The Node B may assign a set of physical channel parameters to the UE in response to the radio link setup request (block 814). The Node B may send first configuration information for the set of physical channel parameters to the RNC (block 816). The Node B may thereafter exchange user data with the UE based on the set of physical channel parameters assigned to the UE and second configuration information stored at the UE while the UE is in a second state (e.g., the CELL_DCH state) (block 818). The UE may transition from the first state to the second state in response to a paging message comprising the first configuration information.

Figure 9:
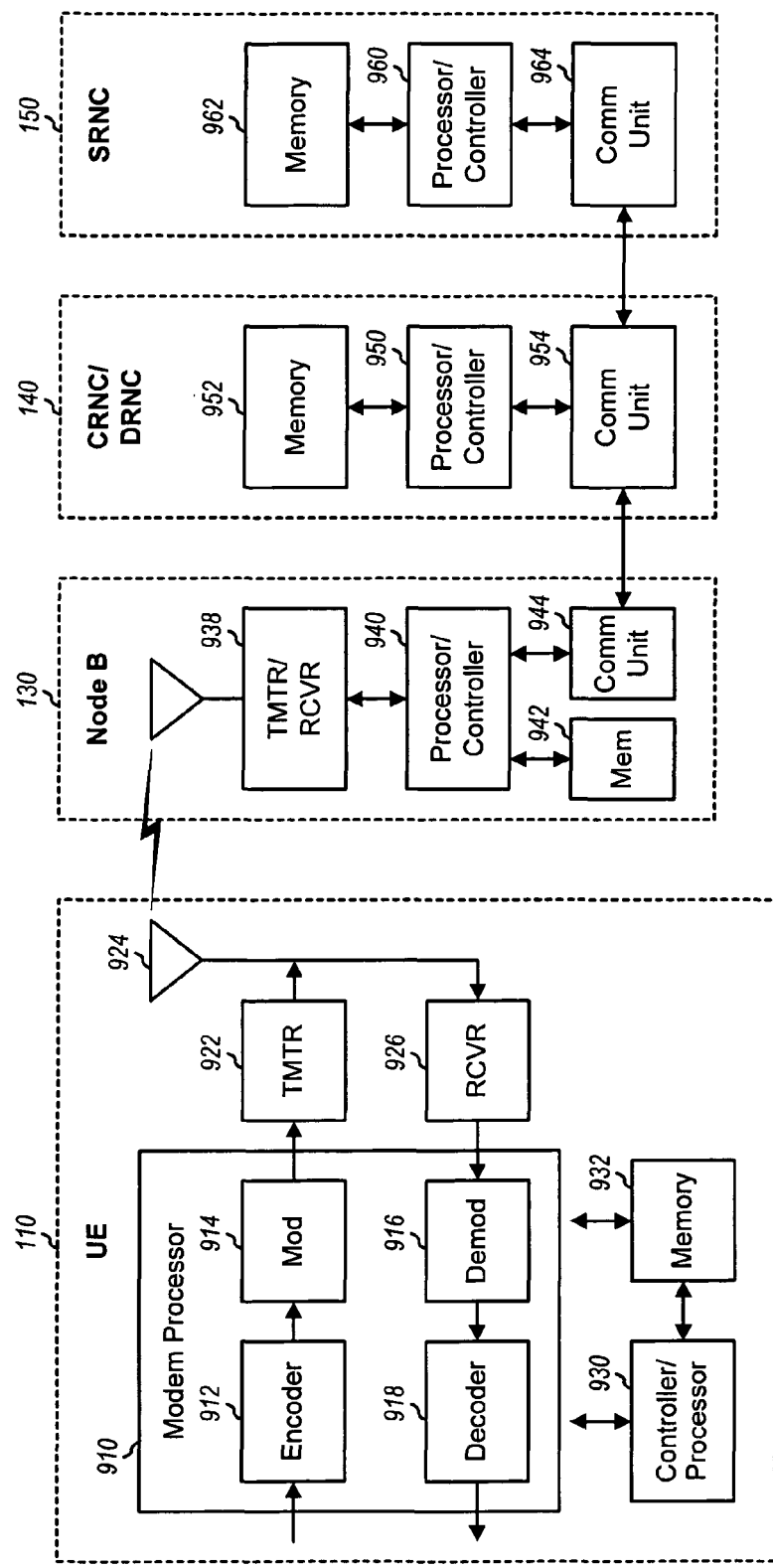
FIG. 9 shows a block diagram of the UE and various network entities.

FIG. 9 shows a block diagram of a design of UE 110, Node B 130, CRNC/DRNC 140, and SRNC 150 in FIG. 1. At UE 110, user data and signaling to be sent by the UE may be processed (e.g., encoded and interleaved) by an encoder 912 and further processed (e.g., modulated, channelized, and scrambled) by a modulator (Mod) 914 to generate output chips. A transmitter (TMTR) 922 may condition (e.g., convert to analog, filter, amplify, and frequency upconvert) the output chips and generate an uplink signal, which may be transmitted via an antenna 924. In the receive path, a downlink signal transmitted by Node B 130 may be received by antenna 924. A receiver (RCVR) 926 may condition (e.g., filter, amplify, frequency downconvert, and digitize) the received signal from antenna 924 and provide samples. The samples may be processed (e.g., descrambled, channelized, and demodulated) by a demodulator (Demod) 916 and further processed (e.g., deinterleaved and decoded) by a decoder 918 to obtain decoded data and signaling. Encoder 912, modulator 914, demodulator 916, and decoder 918 may be implemented by a modem processor 910. These units may perform processing in accordance with the radio technology (e.g., W-CDMA, cdma2000, or GSM) used by the wireless communication network.

A controller/processor 930 may direct the operation of various units at UE 110. Controller/processor 930 may perform process 600 in FIG. 6 and/or other processes for the techniques described herein. A memory 932 may store program codes and data for UE 110.

Node B 130 includes a transmitter/receiver 938, a processor/controller 940, a memory (Mem) 942, and a communication (Comm) unit 944. Transmitter/receiver 938 may support radio communication with UE 110 and other UEs. Processor/controller 940 may perform various functions for communication with UEs and may implement process 800 in FIG. 8 and/or other processes for the techniques described herein. Memory 942 may store program codes and data for Node B 130. Communication unit 944 may facilitate communication with other network entities.

CRNC/DRNC 140 includes a processor/controller 950, a memory 952, and a communication unit 954. Processor/controller 950 may perform various functions to support communication for the UEs. Memory 952 may store program codes and data for CRNC/DRNC 140. Communication unit 954 may facilitate communication with other network entities.

SRNC 150 includes a processor/controller 960, a memory 962, and a communication unit 964. Processor/controller 960 may perform various functions to support communication and paging for the UEs, e.g., determine which cell(s) to page UE 110, send paging messages to the UE, send configuration information in a paging message to the UE for fast state transition, etc. Processor/controller 960 may implement process 700 in FIG. 7 and/or other processes for the techniques described herein. Memory 962 may store program codes and data for SRNC 150. Communication unit 964 may facilitate communication with other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

The invention claimed is:

1. An apparatus for wireless communication, comprising:
at least one processor configured to:
receive a paging message comprising first configuration information for a user equipment (UE);
determine a set of communication parameters based on the first configuration information received from the paging message and second configuration information stored at the UE;
determine a set of physical channel parameters based on the first configuration information received in the paging message;
exchange user data based on the set of communication parameters and the set of physical channel parameters; and
a memory coupled to the at least one processor and configured to store the second configuration information.

2. The apparatus of claim 1, wherein the set of communication parameters comprises the set of physical channel parameters.

3. The apparatus of claim 2, wherein the first configuration information comprises the set of physical channel parameters.

4. The apparatus of claim 2, wherein the first configuration information comprises an identifier of a predefined configuration associated with the set of physical channel parameters.

5. The apparatus of claim 4, wherein the at least one processor is configured to obtain the set of physical channel parameters from system information received from a cell.

6. The apparatus of claim 2, wherein the set of physical channel parameters comprises at least one Radio Network Temporary Identifier (RNTI) for the UE, at least one channelization code for at least one physical channel, at least one time offset for at least one physical channel, at least one signature sequence, a scrambling code, or a combination thereof.

7. The apparatus of claim 2, wherein the at least one processor is configured to receive a PHYSICAL CHANNEL RECONFIGURATION message in the paging message, the PHYSICAL CHANNEL RECONFIGURATION message comprising the first configuration information.

8. The apparatus of claim 1, wherein the at least one processor is configured to use default values for the set of physical channel parameters.

9. The apparatus of claim 1, wherein the at least one processor is configured to monitor for paging messages while in a first state and to store the second configuration information when transitioning to the first state.

10. The apparatus of claim 1, wherein the second configuration information comprises at least one of the set of physical channel parameters, a set of transport channel parameters, a set of radio bearer parameters, a set of radio access bearer parameters, and a set of security parameters.

11. The apparatus of claim 1, wherein the at least one processor is configured to send a response for the paging message on a dedicated transport channel instead of a shared transport channel.

12. The apparatus of claim 1, wherein the at least one processor is configured to receive the paging message on a Paging Channel (PCH) sent via a Secondary Common Control Physical Channel (S-CCPCH) or a High Speed Physical Downlink Shared Channel (HS-PDSCH).

13. The apparatus of claim 1, wherein the at least one processor is configured to:
receive the paging message while operating in a CELL_PCH state in Universal Mobile Telecommunication System (UMTS);
transition from the CELL_PCH state to a CELL_DCH state in response to receiving the paging message; and
send the user data while operating in the CELL_DCH state.

14. The apparatus of claim 1, wherein the at least one processor is configured to:
receive the paging message while operating in a URA_PCH state in Universal Mobile Telecommunication System (UMTS);
transition from the URA_PCH state to a CELL_DCH state in response to receiving the paging message; and
send the user data while operating in the CELL_DCH state.

15. The apparatus of claim 1, wherein the set of physical channel parameters comprises at least one of a time offset for at least one physical channel, and a scrambling code.

16. A method for wireless communication, comprising:
receiving a paging message comprising first configuration information for a user equipment (UE);
determining a set of communication parameters based on the first configuration information received from the paging message and second configuration information stored at the UE;
determining a set of physical channel parameters based on the first configuration information received in the paging message; and
exchanging user data based on the set of communication parameters and the set of physical channel parameters.

17. The method of claim 16, wherein the set of communication parameters comprises the set of physical channel parameters.

18. The method of claim 16, further comprising:
using default values for the set of physical channel parameters.

19. The method of claim 16, further comprising:
monitoring for paging messages while in a first state; and
storing the second configuration information when transitioning to the first state.

20. The method of claim 16, further comprising:
storing at least one of the set of physical channel parameters, a set of transport channel parameters, a set of radio bearer parameters, a set of radio access bearer parameters, and a set of security parameters for the second configuration information.

21. The method of claim 16, further comprising:
receiving the paging message while operating in a CELL_PCH state in Universal Mobile Telecommunication System (UMTS);
transitioning from the CELL_PCH state to a CELL_DCH state in response to receiving the paging message; and
sending the user data while operating in the CELL_DCH state.

22. An apparatus for wireless communication, comprising:
means for receiving a paging message comprising first configuration information for a user equipment (UE);
means for determining a set of communication parameters based on the first configuration information received from the paging message and second configuration information stored at the UE;
means for determining a set of physical channel parameters based on the first configuration information received in the paging message; and
means for exchanging user data based on the set of communication parameters and the set of physical channel parameters.

23. The apparatus of claim 22, wherein the set of physical channel parameters comprises at least one of a time offset for at least one physical channel, and a scrambling code.

24. A computer program product, comprising:
a non-transitory computer-readable medium comprising:
code for causing at least one computer to receive a paging message comprising first configuration information for a user equipment (UE);
code for causing the at least one computer to determine a set of communication parameters based on the first configuration information received from the paging message and second configuration information stored at the UE;
code for causing the at least one computer to determine a set of physical channel parameters based on the first configuration information received in the paging message; and
code for causing the at least one computer to exchange user data based on the set of communication parameters and the set of physical channel parameters.

25. An apparatus for wireless communication, comprising:
at least one processor configured to:
determine first configuration information for a user equipment (UE);
obtain a set of physical channel parameters for the UE from a Node B;
send a paging message comprising the first configuration information including the set of physical channel parameters to the UE;
exchange user data with the UE based on the first configuration information and the set of physical channel parameters sent in the paging message and second configuration information stored at the UE; and
a memory coupled to the at least one processor.

26. The apparatus of claim 25, wherein the at least one processor is configured to provide the set of physical channel parameters in the first configuration information sent to the UE.

27. The apparatus of claim 26, wherein the set of physical channel parameters comprises at least one Radio Network Temporary Identifier (RNTI) for the UE, at least one channelization code for at least one physical channel, at least one time offset for at least one physical channel, at least one signature sequence, a scrambling code, or a combination thereof.

28. The apparatus of claim 26, wherein the at least one processor is configured to:
obtain at least one physical channel parameter from a Controlling Radio Network Controller (CRNC) for the Node B; and
provide the at least one physical channel parameter in the first configuration information, wherein the UE exchanges user data based further on the at least one physical channel parameter from the CRNC.

29. A method for wireless communication, comprising:
determining first configuration information for a user equipment (UE);
obtaining a set of physical channel parameters for the UE from a Node B;
sending a paging message comprising the first configuration information including the set of physical channel parameters to the UE; and
exchanging user data with the UE based on the first configuration information and the set of physical channel parameters sent in the paging message and second configuration information stored at the UE.

30. The method of claim 29, wherein the determining the first configuration information for the UE comprises providing the set of physical channel parameters in the first configuration information sent to the UE.

31. The method of claim 30, wherein the determining the first configuration information for the UE further comprises:
   obtaining at least one physical channel parameter from a Controlling Radio Network Controller (CRNC) for the Node B; and
   providing the at least one physical channel parameter in the first configuration information, wherein the UE exchanges user data based further on the at least one physical channel parameter from the CRNC.

32. The apparatus of claim 29, wherein the set of physical channel parameters comprises at least one Radio Network Temporary Identifier (RNTI) for the UE, at least one channelization code for at least one physical channel, at least one time offset for at least one physical channel, at least one signature sequence, a scrambling code, or a combination thereof.

33. An apparatus for wireless communication, comprising:
   means for determining first configuration information for a user equipment (UE);
   means for obtaining a set of physical channel parameters for the UE from a Node B;
   means for sending a paging message comprising the first configuration information including the set of physical channel parameters to the UE; and
   means for exchanging user data with the UE based on the first configuration information and the set of physical channel parameters sent in the paging message and second configuration information stored at the UE.

34. A computer program product, comprising:
a non-transitory computer-readable medium comprising:
   code for causing at least one computer to determine first configuration information for a user equipment (UE);
   code for causing the at least one computer to obtain a set of physical channel parameters for the UE from a Node B;
   code for causing the at least one computer to send a paging message comprising the first configuration information including the set of physical channel parameters to the UE; and
   code for causing the at least one computer to exchange user data with the UE based on the first configuration information and the set of physical channel parameters sent in the paging message and second configuration information stored at the UE.

* * * * *